United States Patent [19]
Campau

[11] Patent Number: 5,876,639
[45] Date of Patent: Mar. 2, 1999

[54] LIVEWELL AND BAITWELL AERATOR

[75] Inventor: Daniel N. Campau, Grand Rapids, Mich.

[73] Assignee: Flow-Rite Controls, Ltd., Grand Rapids, Mich.

[21] Appl. No.: 812,474

[22] Filed: Mar. 6, 1997

[51] Int. Cl.[6] ............................................. B01F 3/04
[52] U.S. Cl. ................. 261/36.1; 119/263; 261/121.2; 261/DIG. 75
[58] Field of Search .................... 119/226, 263; 261/36.1, 121.2, DIG. 75

[56]     References Cited

U.S. PATENT DOCUMENTS

| 3,587,976 | 6/1971 | Jacuzzi | 261/DIG. 75 |
| 3,829,070 | 8/1974 | Reba et al. | 261/36.1 |
| 4,271,099 | 6/1981 | Kukla | 261/121.2 |
| 4,477,341 | 10/1984 | Schweiss et al. | 261/DIG. 75 |
| 4,564,480 | 1/1986 | Kamelmacher | 261/DIG. 75 |
| 4,865,776 | 9/1989 | Campau . | |
| 4,911,836 | 3/1990 | Haggerty | 261/DIG. 75 |
| 4,927,568 | 5/1990 | Campau . | |
| 5,054,423 | 10/1991 | Escobal | 119/263 |
| 5,061,406 | 10/1991 | Cheng | 261/DIG. 75 |
| 5,167,878 | 12/1992 | Arbisi et al. | 261/DIG. 75 |
| 5,340,473 | 8/1994 | Roberts et al. | 261/DIG. 75 |

FOREIGN PATENT DOCUMENTS 362730  9/1963  Italy ........................................ 119/263

*Primary Examiner*—C. Scott Bushey
*Attorney, Agent, or Firm*—Niro, Scavone, Haller & Niro

[57]     ABSTRACT

An improved aerator for oxygenating water and generating a circulating current within a livewell or baitwell while minimizing damaging turbulence. The aerator includes a downstream expansion area to reduce exit velocity, and an air intake conduit positioned to minimize stagnation of the liquid flow. The new aerator has an increased negative aspiration pressure, and can be operated at lower depths than previously possible.

16 Claims, 6 Drawing Sheets

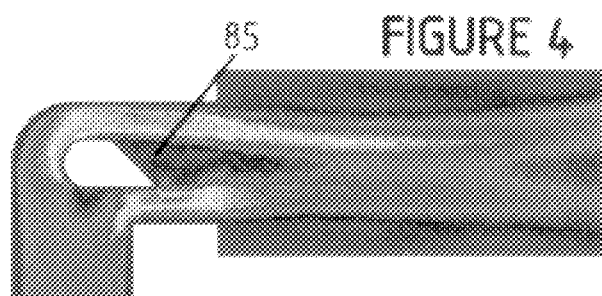
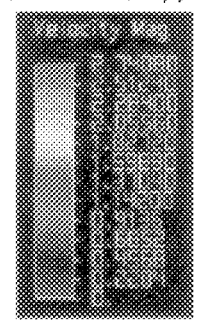
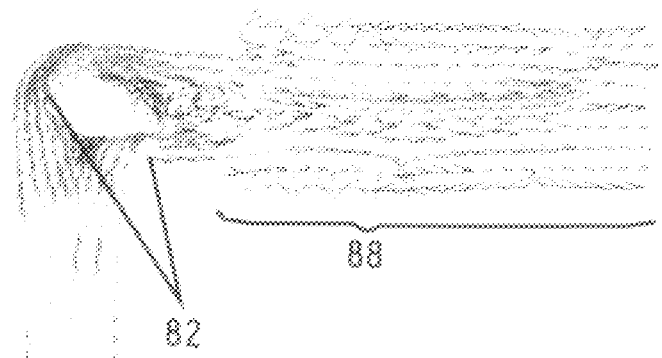
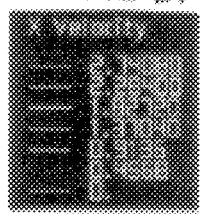
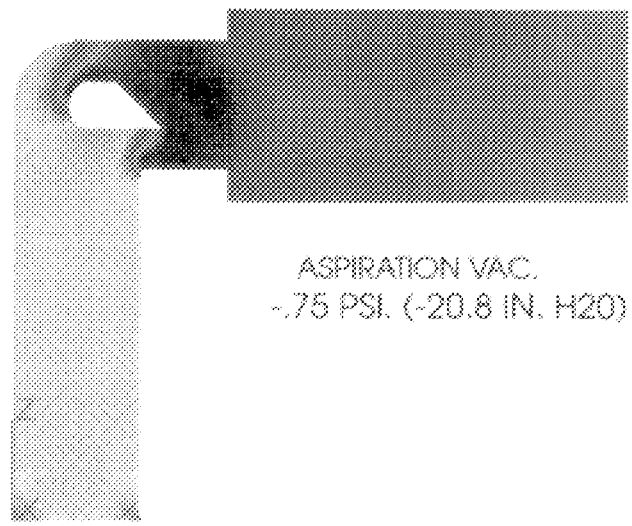
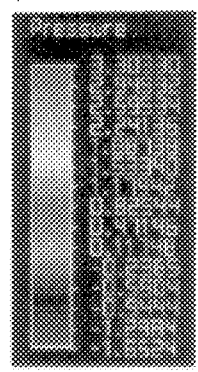
ASPIRATION VAC.
-.75 PSI. (-20.8 IN. H2O)

ASPIRATION VAC.
-.34 PSI (-9.4 IN. H2O)

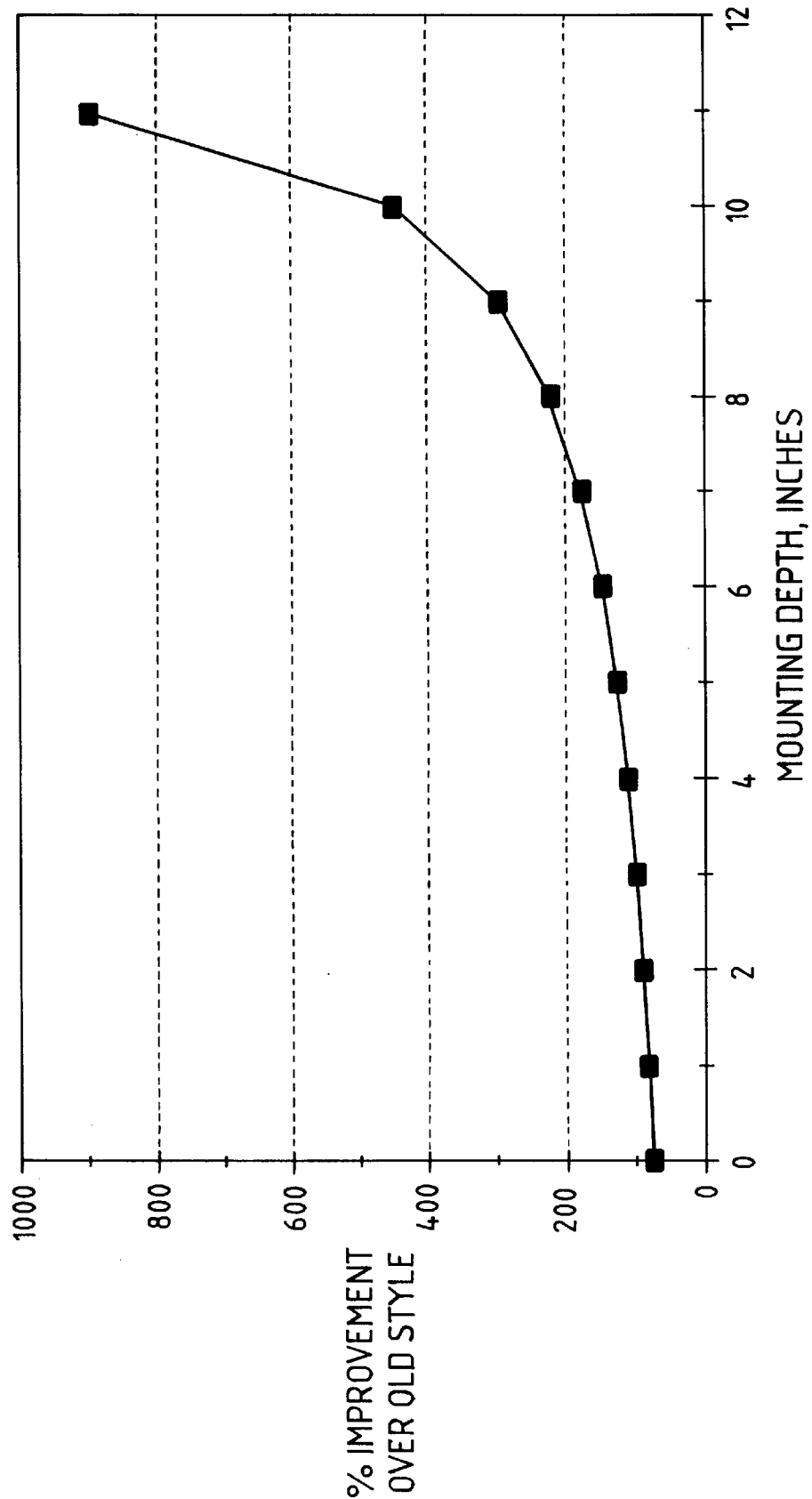

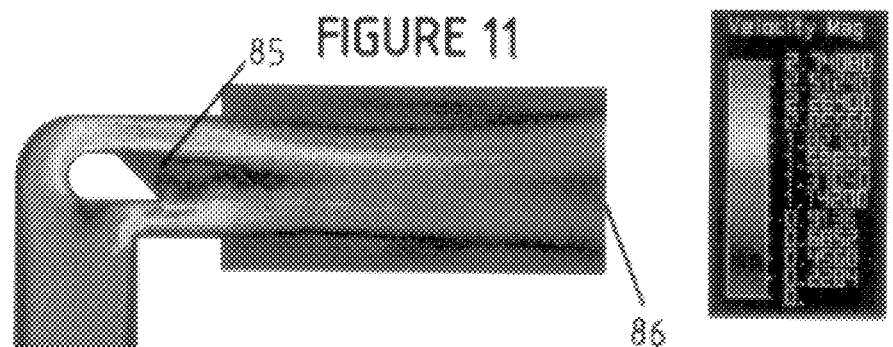
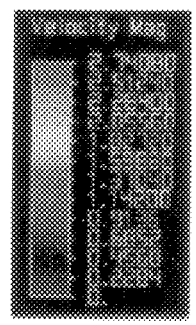
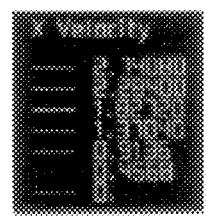
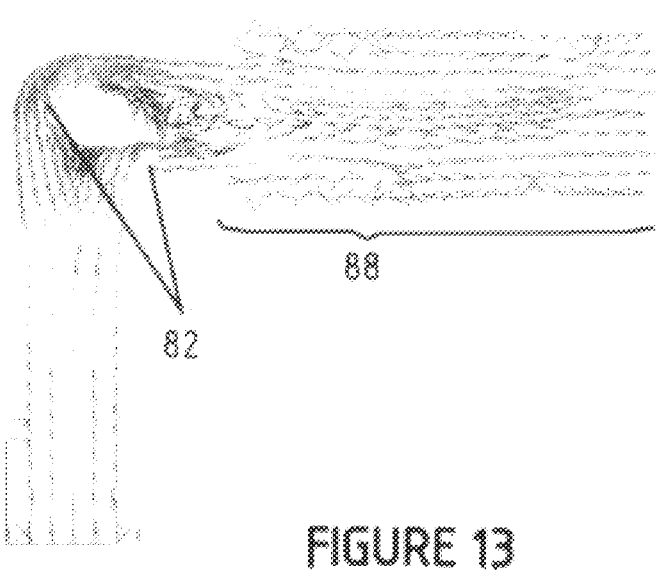
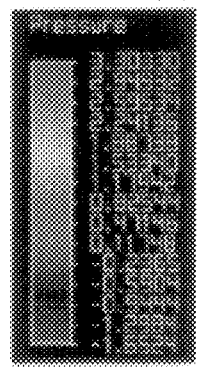
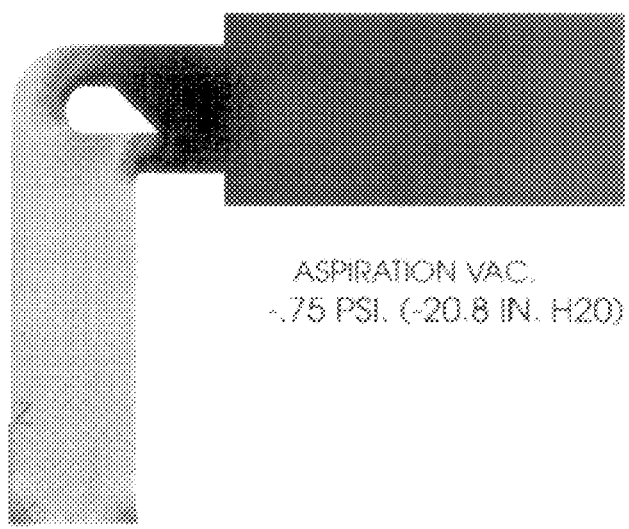

ASPIRATION VAC.
−.34 PSI (−9.4 IN. H2O)

LIVEWELL AND BAITWELL AERATOR

BACKGROUND OF THE INVENTION

The invention is generally directed to an improved aerator for liquids. More specifically, the invention is directed to an aerator for aspirating air into a livewell or baitwell.

It is known to use fishing boat livewell and baitwell aerators. For example, the inventor's own aerators disclosed in U.S. Pat. Nos. 4,865,776 and 4,927,568, hereby incorporated by reference into this application, have met with significant commercial success, and are in wide use in fresh water and salt water applications. One of the features of these aerators is a siphon break to prevent backflow of water from the livewell tank, which typically has a higher water level than the outside water source. This antisiphon feature requires that the aerator head be located above the tank water line. In some boats, valves or check valves are used to prevent backflow. In others, the aerator is used in a recirculating system with no connection to the outside water source. In the latter two cases, a simpler aerator can be used that does not need to be mounted above the water line.

A common aerator configuration for mounting below the water line is in the form of a 90° elbow fitting, as shown in FIG. 1. As shown, the aerator fitting, designated generally as 14, typically has an inlet end 16 with a hose barb 17 for attachment to the outlet of the water supply pump (not shown), and threaded outlet ends 18A, 18B which pass through, and clamp to, the wall 19 of the livewell tank (not shown). An air tube 15 feeds air to the vacuum created by the water flowing through the fitting. It is desirable to locate the aerator low in the tank to replace stale water with fresh oxygenated water. The stale water is lifted out the overflow, or thoroughly mixed with the incoming oxygenated water.

One problem with the conventional aerator is that, for livewell and baitwell applications, it operates in an inefficient manner. (As used here, the term "livewell" is broader than its typical use, and encompasses any holding tanks, such livewells, baitwells or fishtanks, whether boat-mounted or not, which contain water or other liquids requiring aeration.) Thus, the conventional aerator requires excessive water velocity to create adequate aspiration, while also taking undue time to properly aerate (i.e., restore oxygen levels in) the tank. This slow aeration is due either to weak aspiration, or to small water port size which reduces water volume flow. To improve the oxygen restoration rate, water velocity must be increased still further with these aerators, requiring larger pumps and more power consumption, and resulting in more tank turbulence. Tank turbulence should be avoided because it can damage costly bait and/or game fish.

Also, significantly, the aspiration vacuum must be sufficient to overcome the water pressure created by cthe depth at which the aerator is situated. It has been found that the weak aspiration models cannot be mounted very far beneath the tank water level (i.e., less than 12 inches) or aeration will cease completely. Yet actual service often requires that the elbow be mounted 12 inches or more below the water surface.

It is also known to use hydrotherapy spa fittings to mix aspirated air with water. An example of such an aeration device is shown in FIG. 2. However, these fittings are designed to provide therapeutic massaging action using high velocity water and air flow.

The conventional livewell aerator shown in FIG. 1 develops a weak aspiration vacuum at the air inlet. This is due to the constant diameter liquid flow path and secondary flows which develop at the inside and outside bend regions of the elbow, and which act to reduce velocity in the aspiration region (see regions 75 of FIG. 8, showing the eddies which weaken aspiration). While the spa-type aerator shown in FIG. 2 develops a stronger aspiration vacuum, which is achieved by restricting the diameter of the liquid flow path, this also reduces the volume flow rate into the tank. In both the conventional aerators shown in FIGS. 1 and 2, the water velocity into the tank is high and potentially damaging to delicate bait and game fish.

Referring to FIGS. 7 and 8, the normalized output data for the conventional aerator also shows that the exit plane velocities can be as high as 2.5 times the average velocity at the elbow inlet, even though the flow path diameter is constant. This results in a strong stream of water shooting into the tank, potentially into the path of delicate bait or game fish.

The conventional aerator is also an inefficient design because the flow path is partially obstructed by the air inlet tube, which is positioned transverse to the water flow path. This creates a reduction in flow area at the air tube, and forces water flow to one side of the flow path. The flow develops and remains as a high velocity stream into the tank.

While the spa-type aerators (FIG. 2) use a more efficient area reduction to accelerate the water velocity and generate good aspiration vacuum, it has been determined that these aerators also have exit plane velocities 2.5 times the average inlet velocity, based on a ratio of their inlet to outlet areas.

The objective in a baitwell or livewell aerator is to generate a relatively high volume flow rate with a high air/water ratio, while also providing a modest outlet velocity. The outlet velocity should be sufficient to generate a circulating, oxygenating current in the tank without creating damaging turbulence. The aerator also must be designed to fit within the current size envelope if used on boats.

Accordingly, it is an object of the present invention to provide an improved aerator that can be used to generate a relatively high volume flow rate with a high air/water ratio, while also providing a relatively low outlet velocity which will not generate turbulence which can damage the livewell contents.

Another object of the present invention is to provide an aerator for livewell and baitwell applications which can generate a circulating current in the tank without creating damaging turbulence, and do so in an efficient manner.

Still another object of the present invention is to provide a livewell and baitwell aerator that can be used to aspirate air into the liquid flow at depths below one foot of water.

SUMMARY OF THE INVENTION

The present invention preserves the advantages of known aerators for use with livewells or baitwells, whether mounted on a boat or stationary. In addition, it provides new advantages not found in currently available aerators, including those mentioned above as well as others, and overcomes many of the disadvantages of such currently available devices.

The invention is generally directed to an apparatus for aerating water and providing the aerated water to a livewell without causing damaging turbulence to the livewell contents. The aerator apparatus includes conduit means and a pump in fluid communication with a main flow passageway. The main flow passageway forms a liquid flow path including an intake passageway with an inlet portion receiving water from the pump through the conduit means, and a discharge passageway in communication with the livewell for providing aerated water to the livewell. The intake and discharge passageways meet in an elbow portion. The liquid flow path within the elbow portion has an area of negative pressure which forms an aspiration vacuum. An air intake conduit is also provided, and is in communication with the ambient atmosphere. The air intake conduit has a free end located within the area of negative pressure. The aspiration vacuum induces the aspiration of air from the free end of the air intake conduit and into the liquid flow path. The discharge passageway has an expansion area larger in cross-section than the area of the intake passageway, providing a decelerated flow of the water in a region of the liquid flow path downstream of the free end of the air intake conduit, and generating a circulating current of aerated water within the livewell while minimizing damaging turbulence within the livewell.

In one particularly preferred embodiment of the aerator apparatus of the present invention, the water at the exit of the discharge passageway has an average velocity substantially equal to or less than the average velocity of the water at the inlet portion of the intake passageway. Preferably, the water at the exit of the discharge passageway has a peak velocity less than 1.5 times the peak velocity of the water at the inlet portion of the intake passageway, and the expansion area within the discharge passageway has a diameter that is about 1.5 times greater than the diameter of the intake passageway. It is also preferred that the water at the exit of the discharge passageway have a peak velocity which is substantially equal to or less than the peak velocity of the water at the inlet portion of the intake passageway.

Use of the preferred embodiment provides an aspiration vacuum which is at least greater than 10 inches of water vacuum, and preferably greater than 15 and even 18 inches of water vacuum.

In another preferred embodiment, an apparatus is provided for aerating a liquid such as water, and for providing the aerated liquid to a livewell without causing damaging turbulence to the livewell contents. The aerator apparatus may include conduit means and a pump in fluid communication with a main flow passageway. Again, the main flow passageway forms a liquid flow path which includes an intake passageway receiving water from the pump through the conduit means, and a discharge passageway in communication with the livewell for providing aerated water to the livewell. The intake and discharge passageways meet in an elbow portion; the liquid flow path within the elbow portion has an area of negative pressure forming an aspiration vacuum. An air air intake conduit is also provided, and is in communication with the ambient atmosphere, and has a free end located within the area of negative pressure. The aspiration vacuum induces the aspiration of air from the free end of the air intake conduit and into the liquid flow path. The air intake conduit is positioned within the main flow passageway to minimize stagnation of water flow due to the presence of the air intake conduit within the liquid flow path. The discharge passageway has an expansion area larger in cross-section than the area of the intake passageway, and provides a decelerated flow of the water in a region of the liquid flow path downstream of the free end of the air intake conduit. A circulating current of aerated water is generated within the livewell while damaging turbulence within the livewell is minimized. Preferably, the free end of the air intake conduit is positioned upstream of the expansion area a distance about equal to twice the diameter of the air intake conduit. It is also preferred that the air intake conduit be positioned generally parallel to the liquid flow path of the discharge passageway, and that the free end of the air intake conduit includes an upwardly facing bevel, which is preferably inclined from the horizontal at an angle of 45°.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

FIG. 4 is a schematic view of a computational fluid dynamic (CFD) analysis showing velocity magnitudes for the improved aerator of the present invention;

FIG. 4A is a table showing velocity magnitude values, color-coded with FIG. 4;

FIG. 5 is a schematic view of a CFD analysis showing velocity vectors for the improved aerator of the present invention;

FIG. 5A is a table showing velocity vectors, color-coded with FIG. 5;

FIG. 6 is a schematic view of a CFD analysis showing pressures for the improved aerator of the present invention;

FIG. 6A is a table showing pressure values, color-coded with FIG. 6;

FIGS. 7A–9A are tables showing similar values to that shown in the tables of FIGS. 4A–6A, respectively, and color-coded with FIGS. 7–9, respectively, for the conventional aerator shown in FIG. 1;

FIG. 10 shows data, in a graph form, illustrating the aspiration performance of the present invention versus a prior art aerator; and FIGS. 11–16 and 11A–16A are colorized views identical to FIGS. 4–9 and 4A–9A, respectively.

DETAILED DESCRIPTION OF THE PREFERRED EMBODIMENT

Figure 3:
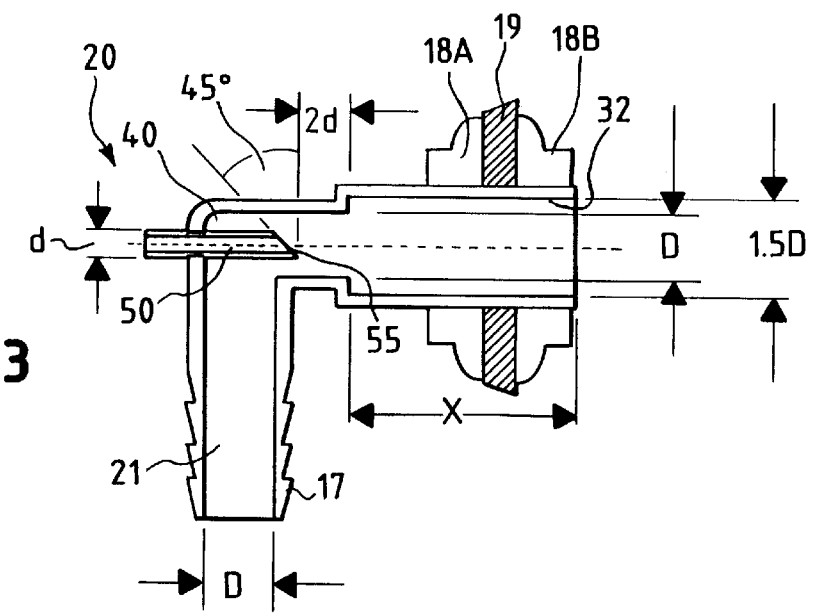
FIG. 3 is a schematic view of the improved aerator of the present invention.

Referring now to FIG. 3, the improved aerator of the present invention is generally designated with the reference numeral 20. Aerator 20 includes an intake passageway 21, a discharge passageway 30, and an elbow portion 40; these components form the main passageway for the liquid flow path through aerator 20.

Intake passageway 21 can include a hose barb 17 or other components permitting attachment to the outlet of a water supply pump (not shown). Discharge passageway 30 may include a threaded end which passes through a wall of the livewell tank. Threaded components 18A, 18B can then be used to firmly clamp the aerator to the wall of the tank. Preferably, aerator 20 is located low in the tank to efficiently replace the stale liquid with fresh oxygenated liquid. The stale liquid is lifted out through an overflow pipe (not shown) or thoroughly mixed with the incoming aerated liquid.

An air intake conduit 50 has one end which is in communication with the atmosphere. A second, free end 55 supplies air to a vacuum region within elbow 40 which is created by the liquid flow.

In use, water or another liquid enters intake passageway 21, under pressure from a pump (not shown), and flows through elbow 40. Flow through elbow 40 creates negative pressure at the elbow in the region of air intake conduit free end 55.

NEW ELBOW AERATOR VS. CURRENT ELBOW AERATOR
% Aspiration Improvement vs. Mounting Depth

| Mounting Depth inches | Aspiration Vacuum | | Improvement | |
|---|---|---|---|---|
| | New in.H2O | Current in.H2O | New-Current in.H2O | % Improvement |
| 0 | 21 | 12 | 9 | 75 |
| 1 | 20 | 11 | 9 | 82 |
| 2 | 19 | 10 | 9 | 90 |
| 3 | 18 | 9 | 9 | 100 |
| 4 | 17 | 8 | 9 | 113 |
| 5 | 16 | 7 | 9 | 129 |
| 6 | 15 | 6 | 9 | 150 |
| 7 | 14 | 5 | 9 | 180 |
| 8 | 13 | 4 | 9 | 225 |
| 9 | 12 | 3 | 9 | 300 |
| 10 | 11 | 2 | 9 | 450 |
| 11 | 10 | 1 | 9 | 900 |
| 12 | 9 | 0 | 9 | ERR |

Free end 55 of air intake conduit 50 is situated within this aspiration vacuum. The aerated liquid then exits through expansion area 32 of discharge passageway 30, and is allowed to flow into a livewell (not shown). The exit flow of the aerated liquid is sufficient to generate a circulating current within the livewell, but will not cause turbulence that can damage the contents of the livewell (such as fish or bait).

Figure 1:
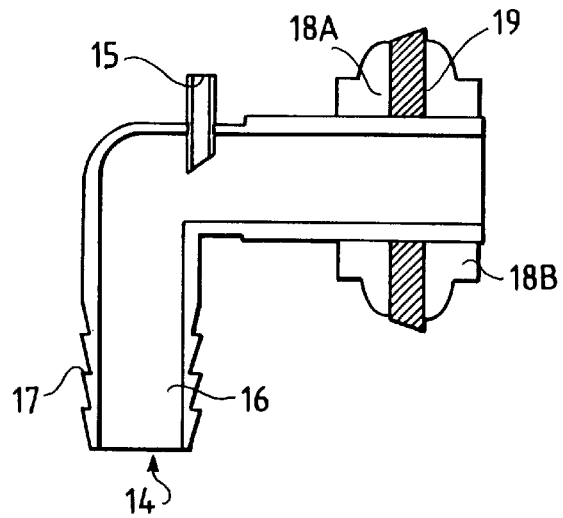
FIGS. 1 and 2 are schematic views of prior art aerators.
Figure 2:
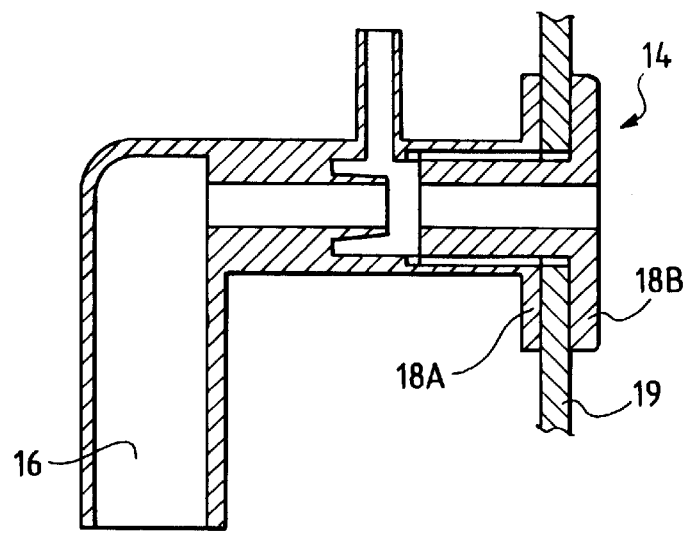

A computational fluid dynamic analysis (CFD analysis) was done using two-dimensional models of the conventional elbow-type aerator shown in FIG. 1, and of the improved aerator (FIG. 3). The results are shown in FIGS. 4–6 (for the improved aerator of the present invention and FIGS. 7–9 (for the conventional aerator). The computer models correspond to a typical operating condition in which the aerator is supplied with water from a 500 gallon/hour pump.

Figure 7:
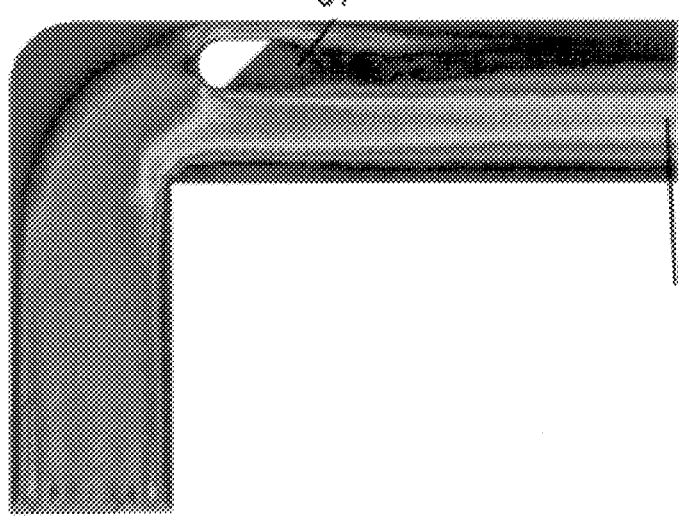
FIGS. 7–9 are schematic views of CFD analyses, similar to FIGS. 4–6, respectively, for the conventional aerator shown in FIG. 1.
Figure 7A:
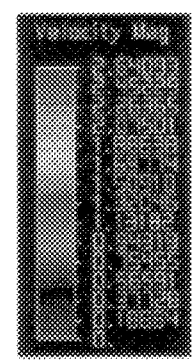
Figure 8:
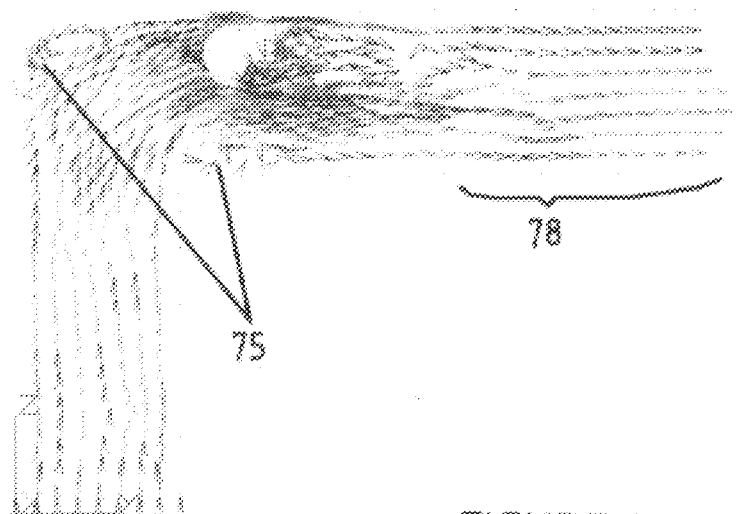
Figure 8A:
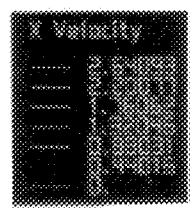
Figure 9:
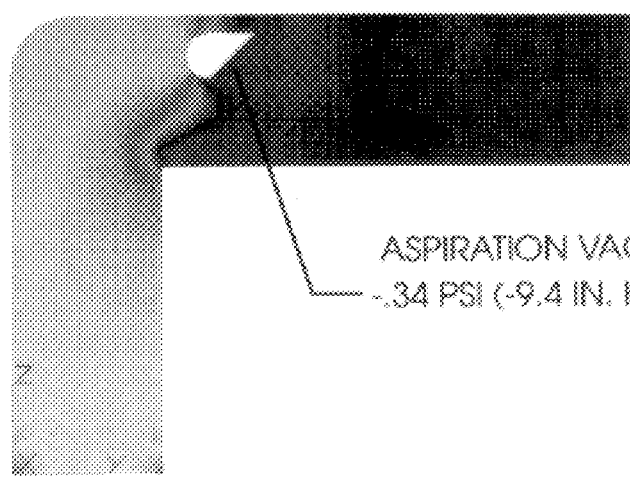
Figure 9A:
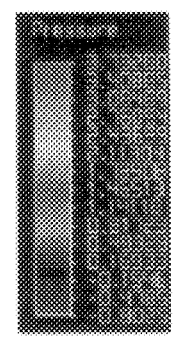
Figure 14:
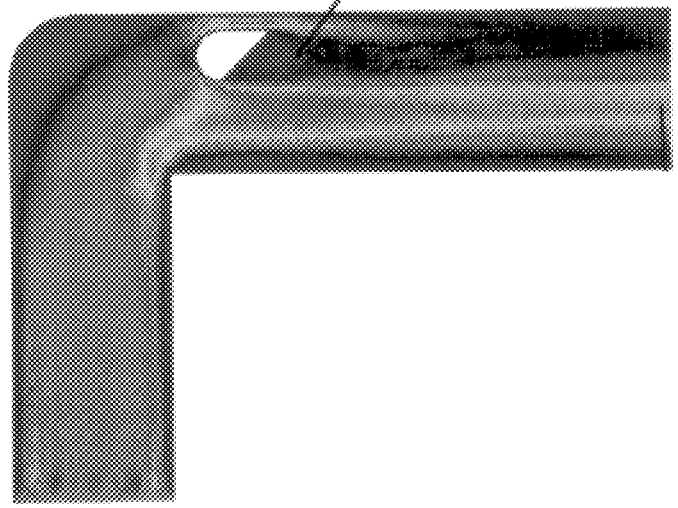
Figure 14A:
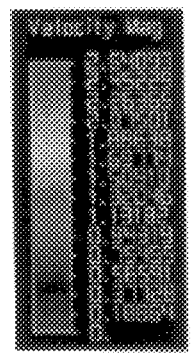
Figure 15:
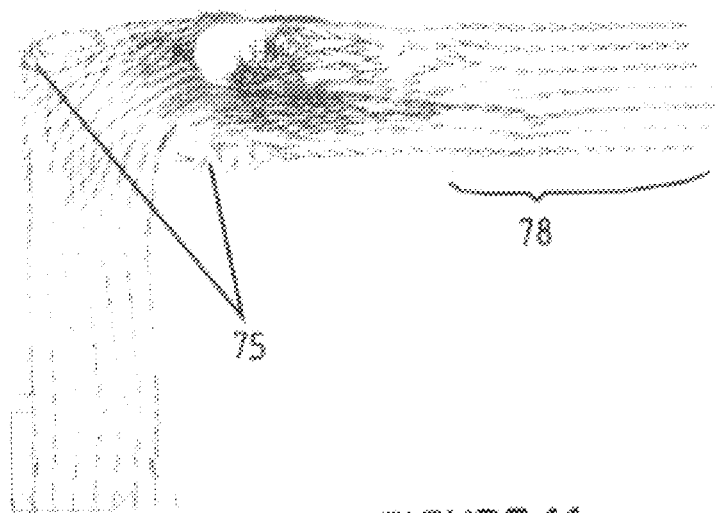
Figure 15A:
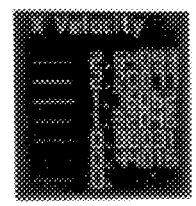
Figure 16:
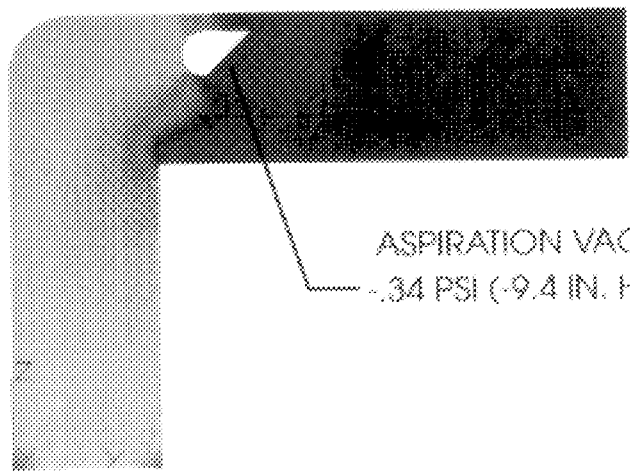
Figure 16A:
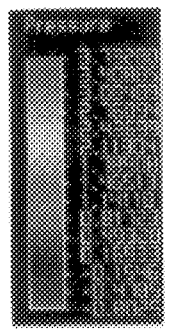

The CFD analysis results shown in FIGS. 7–9 demonstrate the inefficient flow (eddies) in the elbow bend regions and the high exit velocity into the tank. FIG. 7, for example, illustrates the region 67 of weak aspiration in the conventional aerator. Similarly, FIG. 8 illustrates how the eddies in regions 75 weaken aspiration, while the lack of eddies in region 78 reduces oxygen mixing and increases exit velocities and tank turbulence. FIG. 9 shows that for the conventional aerator, the model predicts an aspiration pressure of 9.4 inches of water vacuum at the free end 55 of air intake conduit 50. Good agreement with the predicted value was obtained in actual flow tests, which produced an aspiration pressure of 9–11 inches of water vacuum. In actual flow tests, only a very small amount of air was visible in the water exiting the elbow into the tank when the aerator was 8 inches below water level, and aeration ceased when the elbow portion of the aerator was more than 10–11 inches below water level.

The improved aerator design of the present invention, with its relatively large ports offering low resistance, offers the unique combination of strong aspiration vacuum with high volume flow and low exit velocity. Expansion region 32 provides a downstream expansion of discharge passageway 30, decelerating the flow after the air has been drawn into the flow. This deceleration helps reduce flow velocity into the tank to eliminate damaging turbulence. The expansion also reduces flow resistance through the aerator to provide good volume flow rate. The geometry of the new aerator also produces smoother flow through elbow 40, which reduces the losses caused by secondary flows in the bend regions experienced by the typical elbow aerator.

Preferably, referring to FIG. 3, air intake conduit 50 is positioned upstream of expansion area 32 and parallel to the flow through discharge passageway 30, so that no stagnation areas are formed within elbow 40. Most preferably, air intake conduit 50 is positioned so that its longitudinal axis is coincident with the longitudinal axis of the outlet flow path within discharge passageway 30. This places air intake conduit 50 within the highest velocity region of the flow field, where free end 55 can be surrounded by fast flowing water. This is in contrast with the transverse air inlet tube configuration of the typical elbow aerator, which causes a partial deceleration of the flow at the air inlet, where the flow is diverted around the tube rather than flowing parallel to it.

As seen in FIGS. 4–6, for the new aerator design the flow is smooth around bend regions 82, helping to produce stronger aspiration in region 85; as shown, the flow is quite uniform around air intake conduit 50, and then expands and slows as it exits aerator 20 into the tank. As seen in FIG. 4, the exit velocities at the exit plane 86 of the discharge passageway are relatively low as the stream spreads across the diameter. Referring to FIG. 5, the reverse flow and eddies in region 88 aid in mixing oxygen and dissipate the water velocity to minimize tank turbulence. As seen in FIG. 6, at the free end of the air intake conduit the pressure is 20.8 inches of water vacuum, which provides strong aeration and permits the aerator to be used at about twice the depth of typical elbow aerators.

The efficiency of the aerator design of the present invention also allows the use of smaller pumps that will provide good aeration at lower depths than previously possible with elbow-type aerators. For example, for pumps that supply water in the range of between 300–1000 gallons/hour, the aerator of the invention can aspirate an air volume about 40% greater than the air volume which can be aspirated using aerators of the design shown in FIG. 1.

Referring now to FIG. 10 and the charted data below, it can be seen that the aerator of the present invention (labeled "new elbow aerator") provides dramatically improved aspiration at various mounting depths, versus the prior art aerator shown in FIG. 1 (labeled "current elbow aerator"):

Free end 55 of air intake conduit 50 should be located upstream from expansion region 32. It has been found that if free end 55 is located too far downstream, so that it is very close to or within expansion area 32, the aspiration vacuum is much weaker. For maximum aspiration, it has been found that free end 55 should be located about two air tube diameters upstream from the beginning of expansion area 32.

It has also been experimentally determined that free end 55 should include an upwardly facing bevel, as shown in FIG. 3. Due to the flow around elbow 40, it was found that the best balance of flow around air intake conduit 50 is obtained by beveling the end about 45°. When the end is square, aspiration is reduced from about 21 inches of water vacuum to about 15 inches, due to uneven flow velocities around the air intake conduit. This upwardly facing bevel on free end 55 is opposite from the bevel used on conventional aerators, shown in FIG. 1, which faces downward. The downward bevel on the air inlet tube of FIG. 1 places a portion of the tube in a slower velocity region, and a portion of the tube in a higher velocity region. The result is weaker aspiration than can be achieved by the new aerator, which can locate and orient free end 55 so that it is surrounded by a maximum, uniform liquid velocity, to generate the strongest aspiration vacuum.

Still referring to FIG. 3, in a particularly preferred embodiment, and without limiting the scope of the invention, the geometry is as follows. Air intake conduit 50 has a diameter "d", and is positioned so that its longitudinal axis is coincident with the liquid flow path of discharge passageway 30; free end 55 is positioned upstream from the beginning of expansion area 32 a distance equal to about 2 d. For an intake passageway diameter "D", the diameter of expansion area 32 is 1.5 D, and the length of expansion area 32, "X" is 2.65 d. In one particularly preferred embodiment, D=0.5 inches and d=0.188 inches. Given this geometry, it can be computed that the water at the exit of the discharge passageway will have an average velocity about 67% less than the average velocity of the water at the inlet portion of the intake passageway.

As indicated above, improved aerator 20 of the present invention can be boat-mounted, or used with other aerator applications, such as those associated with fisheries or hatcheries, or with smaller-scale applications such as fish-tanks. Additionally, the principles of the present invention can be adapted to provide aerator devices that can be used to aerate liquids other than water.

It will be understood that the invention may be embodied in other specific forms without departing from its spirit or central characteristics. The present examples and embodiments, therefore, are to be considered in all respects as illustrative and not restrictive, and the invention is not to be limited to the details given here.

I claim:

1. An apparatus for aerating water and providing the aerated water to a livewell without causing damaging turbulence to the livewell contents, comprising:

conduit means and a pump in fluid communication with a main flow passageway;

the main flow passageway forming a liquid flow path including an intake passageway of constant diameter with an inlet portion receiving water from the pump through the conduit means, and a discharge passageway in communication with the livewell for providing aerated water to the livewell, the intake and discharge passageways meeting in an elbow portion;

the liquid flow path within the elbow portion having an area of negative pressure forming an aspiration vacuum;

an air intake conduit in communication with the ambient atmosphere and having a free end located within the area of negative pressure, the aspiration vacuum inducing the aspiration of air from the free end of the air intake conduit and into the liquid flow path;

the discharge passageway having an expansion area larger in cross-section than the area of the intake passageway, providing a decelerated flow of the water in a region of the liquid flow path downstream of the free end of the air intake conduit, and thereby generating a circulating current of aerated water within the livewell while minimizing damaging turbulence within the livewell; and wherein the water at the exit of the discharge passageway has an average velocity substantially equal to or less than the average velocity of the water at the inlet portion of the intake passageway.

2. An apparatus for aerating water and providing the aerated water to a livewell without causing damaging turbulence to the livewell contents, comprising:

conduit means and a pump in fluid communication with a main flow passageway;

the main flow passageway forming a liquid flow path including an intake passageway of constant diameter with an inlet portion receiving water from the pump through the conduit means, and a discharge passageway in communication with the livewell for providing aerated water to the livewell, the intake and discharge passageways meeting in an elbow portion;

the liquid flow path within the elbow portion having an area of negative pressure forming an aspiration vacuum;

an air intake conduit in communication with the ambient atmosphere and having a free end located within the area of negative pressure, the aspiration vacuum inducing the aspiration of air from the free end of the air intake conduit and into the liquid flow path;

the discharge passageway having an expansion area larger in cross-section than the area of the intake passageway, providing a decelerated flow of the water in a region of the liquid flow path downstream of the free end of the air intake conduit, and thereby generating a circulating current of aerated water within the livewell while minimizing damaging turbulence within the livewell;

wherein the water at the exit of said discharge passageway has an average velocity substantially equal to or less than the average velocity of the water at said inlet portion of said intake passageway; and wherein the water at the exit of the discharge passageway has a peak velocity less than 1.5 times the peak velocity of the water at the inlet portion of the intake passageway.

3. The aerator apparatus of claim 2, wherein the water at the exit of the discharge passageway has a peak velocity substantially equal to or less than the peak velocity of the water at the inlet portion of the intake passageway.

4. An apparatus for aerating water and providing the aerated water to a livewell without causing damaging turbulence to the livewell contents, comprising:

conduit means and a pump in fluid communication with a main flow passageway;

the main flow passageway forming a liquid flow path including an intake passageway of constant diameter with an inlet portion receiving water from the pump through the conduit means, and a discharge passageway in communication with the livewell for providing aerated water to the livewell, the intake and discharge passageways meeting in an elbow portion;

the liquid flow path within the elbow portion having an area of negative pressure forming an aspiration vacuum;

an air intake conduit in communication with the ambient atmosphere and having a free end located within the area of negative pressure, the aspiration vacuum inducing the aspiration of air from the free end of the air intake conduit and into the liquid flow path;

the discharge passageway having an expansion area larger in cross-section than the area of the intake passageway, providing a decelerated flow of the water in a region of the liquid flow path downstream of the free end of the air intake conduit, and thereby generating a circulating current of aerated water within the livewell while minimizing damaging turbulence within the livewell;

wherein the water at the exit of the discharge passageway has an average velocity substantially equal to or less than the average velocity of the water at the inlet portion of the intake passageway; and wherein the aspiration vacuum is greater than 12 inches of water vacuum.

5. The aerator apparatus of claim 4, wherein the aspiration vacuum is greater than 15 inches of water vacuum.

6. The aerator apparatus of claim 4, wherein the aspiration vacuum is greater than 18 inches of water vacuum.

7. The aerator apparatus of claim 4, wherein the aspiration vacuum is greater than 10 inches of water vacuum at a mounting depth greater than 9 inches.

8. An apparatus for aerating water and providing the aerated water to a livewell without causing damaging turbulence to the livewell contents, comprising:

conduit means and a pump in fluid communication with a main flow passageway;

the main flow passageway forming a liquid flow path including an intake passageway of constant diameter with an inlet portion receiving water from the pump through the conduit means, and a discharge passageway in communication with the livewell for providing aerated water to the livewell, the intake and discharge passageways meeting in an elbow portion;

the liquid flow path within the elbow portion having an area of negative pressure forming an aspiration vacuum;

an air intake conduit in communication with the ambient atmosphere and having a free end located within the area of negative pressure, the aspiration vacuum inducing the aspiration of air from the free end of the air intake conduit and into the liquid flow path;

the discharge passageway having an expansion area larger in cross-section than the area of the intake passageway, providing a decelerated flow of the water in a region of the liquid flow path downstream of the free end of the air intake conduit, and thereby generating a circulating current of aerated water within the livewell while minimizing damaging turbulence within the livewell;

wherein the water at the exit of said discharge passageway has an average velocity substantially equal to or less than the average velocity of the water at the inlet portion of the intake passageway; and wherein the expansion area within the discharge passageway has a diameter that is about 1.5 times greater than the diameter of the intake passageway.

9. An apparatus for aerating water and providing the aerated water to a livewell without causing damaging turbulence to the livewell contents, comprising:

conduit means and a pump in fluid communication with a main flow passageway;

the main flow passageway forming a liquid flow path including an intake passageway of constant diameter receiving water from the pump through the conduit means, and a discharge passageway in communication with the livewell for providing aerated water to the livewell, the intake and discharge passageways meeting in an elbow portion;

the liquid flow path within the elbow portion having an area of negative pressure forming an aspiration vacuum;

an air intake conduit in communication with the ambient atmosphere and having a free end located within the area of negative pressure, the aspiration vacuum inducing the aspiration of air from the free end of the air intake conduit and into the liquid flow path;

the air intake conduit being positioned within the main flow passageway so as to minimize stagnation of water flow due to the presence of the air intake conduit within the liquid flow path; and the discharge passageway having an expansion area larger in cross-section than the area of the intake passageway, providing a decelerated flow of the water in a region of the liquid flow path downstream of the free end of the air intake conduit, and thereby generating a circulating current of aerated water within the livewell while minimizing damaging turbulence within the livewell.

10. The aerator apparatus of claim 9, wherein the free end of the air intake conduit is positioned upstream of the expansion area.

11. The aerator apparatus of claim 9, wherein the free end of the air intake conduit is positioned upstream of the expansion area a distance about equal to twice the diameter of the air intake conduit.

12. The aerator apparatus of claim 9, wherein the air intake conduit is positioned generally parallel to the liquid flow path of the discharge passageway.

13. The apparatus of claim 9, wherein the air intake conduit has a longitudinal axis which is coincident with the longitudinal axis of the liquid flow path within the discharge passageway.

14. An apparatus for aerating water and providing the aerated water to a livewell without causing damaging turbulence to the livewell contents, comprising:

conduit means and a pump in fluid communication with a main flow passageway;

the main flow passageway forming a liquid flow path including an intake passageway of constant diameter receiving water from the pump through the conduit means, and a discharge passageway in communication with the livewell for providing aerated water to the livewell, the intake and discharge passageways meeting in an elbow portion;

the liquid flow path within the elbow portion having an area of negative pressure forming an aspiration vacuum;

an air intake conduit in communication with the ambient atmosphere and having a free end located within the area of negative pressure, the aspiration vacuum inducing the aspiration of air from the free end of the air intake conduit and into the liquid flow path;

the air intake conduit being positioned within the main flow passageway so as to minimize stagnation of water flow due to the presence of the air intake conduit within the liquid flow path; and the discharge passageway having an expansion area larger in cross-section than the area of the intake passageway, providing a decelerated flow of the water in a region of the liquid flow path downstream of the free end of the air intake conduit, and thereby generating a circulating current of aerated water within the livewell while minimizing damaging turbulence within the livewell; and wherein the free end of the air intake conduit includes a bevel facing the portion of the wall with the larger bend radius.

15. The apparatus of claim 14, wherein the bevel facing the portion of the wall with the larger bend radius is inclined from the horizontal at an angle of 45°.

16. An apparatus for aerating a liquid and providing the aerated liquid to a first source without causing damaging turbulence to the contents of the first source, comprising:

a main flow passageway forming a liquid flow path including an intake passageway of constant diameter for receiving the liquid from a second source, and a discharge passageway in communication with the first source for providing the aerated liquid to the first source, the intake and discharge passageways meeting in an elbow portion;

the liquid flow path within the elbow portion having an area of negative pressure forming an aspiration vacuum;

an air intake conduit in communication with the ambient atmosphere and having a free end located within the area of negative pressure, the aspiration vacuum inducing the aspiration of air from the free end of the air intake conduit and into the liquid flow path;

the discharge passageway having an expansion area larger in cross-section than the area of the intake passageway, providing a decelerated flow of the liquid in a region of the liquid flow path downstream of the free end of the air intake conduit;

the air intake conduit being positioned within the highest velocity region of the liquid flow path at a portion of the discharge passageway upstream of the expansion area, to maximize the aspiration vacuum;

thereby generating a circulating current of the aerated liquid within the first source while minimizing damaging turbulence within the first source.

* * * * *